(No Model.)
J. W. BEAL.
HUB ATTACHING DEVICE.
No. 351,847. Patented Nov. 2, 1886.
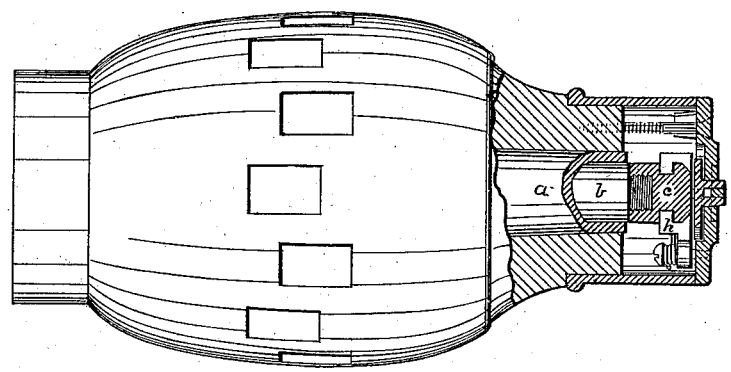
Fig 1
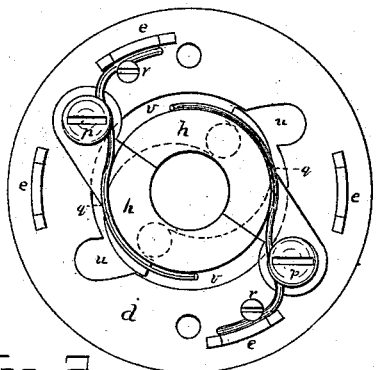
Fig 2
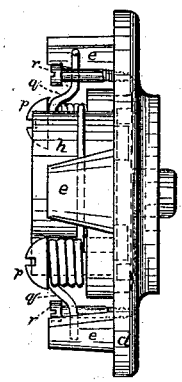
Fig 3
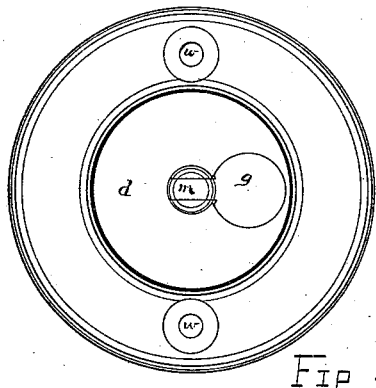
Fig 4
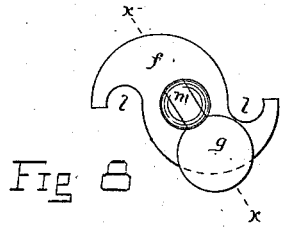
Fig 8
Fig 9
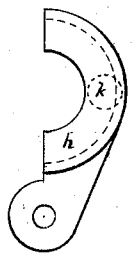
Fig 5  Fig 6
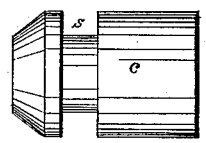
Fig 7
WITNESSES
A. F. Andrews
W. L. Wilder
INVENTOR
J. Williams Beal
By J. F. Brown
Att'y

UNITED STATES PATENT OFFICE.

J. WILLIAMS BEAL, OF HANOVER, MASSACHUSETTS.

HUB-ATTACHING DEVICE.

SPECIFICATION forming part of Letters Patent No. 351,847, dated November 2, 1886.

Application filed July 6, 1886. Serial No. 207,280. (No model.)

*To all whom it may concern:*

Be it known that I, J. WILLIAMS BEAL, a citizen of the United States, and a resident of Hanover, in the county of Plymouth and State of Massachusetts, have invented certain new and useful Improvements in Devices for Attaching Wheels to their Axles; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of the hub of a wheel with a portion thereof removed, illustrating the application of my invention to the wheel. Fig. 2 is an inside elevation of my device, showing the combination of the different parts composing the same. Fig. 3 is a side elevation for the same purpose. Fig. 4 is an outside view showing the thumb-piece turned down so as to secure the cam in its place. Figs. 5 and 6 are a plan view and side elevation of the jaws or clutches $h\ h$; Fig. 7, a view of the cylindrical nut; Fig. 8, a plan view of the cam and thumb-piece; and Fig. 9 a cross-section of the same on the line $xx$, showing the spring beneath the thumb-piece, by means of which it is held in place.

Similar letters refer to similar parts in each of the several views.

This invention relates to the securing of carriage-wheels to their axles; and it consists of—

First. A circular plate, $d$, Figs. 2, 3, and 4, made of iron or other metal, having projections or tongues upon its inner surface, as shown at $e$, and having a recess in the center of the same surface, as shown at $v$, Fig. 2, to receive the cam $f$, Figs. 8 and 9, and also provided with a recess on its outer surface to receive the thumb-piece $g$, when turned down to secure the cam in place, as shown at $g$, Fig. 4.

Second. The jaws or clutches $h\ h$, Figs. 2, 3, 5, and 6, made of suitable material. I prefer to use steel of the peculiar form shown, having an arm upon the side thereof, through which a pivot passes, upon which they are made to swing. Upon the flat side of these jaws there is a semicircular recess formed to receive the end of the nut $c$, Figs. 1 and 7. These jaws are also provided with a circular hub, $k$, upon the bottom thereof, so that they may be made to swing upon the pivots passing through the arms, by means of the cam $f$ being rotated and coming in contact therewith.

Third. The cam $f$, Figs. 8 and 9, is also of metal, and is so constructed that its outer ends shall form a hook, as at $l\ l$, to pass around the circular hub upon the bottom of the jaws $h$, when turned in a proper position, and thus secure the jaws together, when desired. Upon the center of this cam a hub is provided, as shown, which passes through the center of the plate $d$, and to which a thumb-piece is attached by means of a tongue, $m$, and pin $n$, in such a manner that it may be turned up perpendicular to the surface of the cam, or turned down, as shown in Fig. 9, and also in Fig. 4, into the recess prepared for it upon the outside of the plate $d$, thus forming a lock to prevent the cam being turned at an improper time. Beneath the tongue $m$ is placed the spring $o$, which insures the thumb-piece $g$ being held in its proper position.

Fifth. The screws $p\ p$, which are used as pivots upon which the jaws are made to swing, are encircled by the springs $q\ q$, one end of which coming in contact with the back of the jaws tends to force them together, the other end being secured against the side of the tongue $e$ by means of the screws $r\ r$ in such a way as to keep a constant tension upon the springs.

Sixth. In combination with these devices is used the cylindrical nut $c$, Fig. 7, also shown in section in Fig. 1. This nut is simply a piece of metal (I prefer to use steel) of cylindrical form, of the same diameter as the axle, upon the end of which it is screwed in place of the common nut, a thread having been provided within its end for this purpose. Around this nut and near its end is formed the annular groove $s$, and the outer end chamfered off so as to conform to the cavity within the face of the jaws $h\ h$, to which it fits. These various parts are assembled together, as shown in Figs. 2, 3, and 4, by placing the cam in the recess provided for it on the plate $d$, its hub passing through the plate, and the thumb-piece $g$ secured in its place. The jaws or clutches $h\ h$ are now secured to the plate in the position shown in Fig. 2, so that their flat surfaces shall come together, and the circular hubs $k\ k$ come in contact with the cam, as shown by the dotted lines beneath, by means of the screws $p\ p$ first passing through the springs $q\ q$, as shown, thence through the arms, and screwed into the plate beneath in holes provided for that purpose. The end of the spring $q$ is now secured against the side of the tongue $e$ by means of the screw $r$, as shown. This brings the opposite end of the spring to bear against the jaws, and causes them to close together.

The manner of application to the wheel is very simple. The ordinary nut is removed from the axle and the nut $c$ screwed on in its place. The thumb-piece $g$ is now turned up, and by it the cam $f$ is made to rotate, thus forcing the jaws or clutches $h\ h$ apart, the hubs $k\ k$ passing into the recess $u\ u$, and the device applied to the end of the wheel, the tongues $e\ e\ e$ passing inside of the point-band on the hub until the plate $d$ comes in contact therewith, as shown in Fig. 1. The cam is now released, and the jaws allowed to close around the nut. The device is now secured to the wheel by means of common screws passing through the holes in the plate, as shown at $w\ w$, Fig. 4, and being screwed into the end of the hub, as shown in Fig. 1.

It will readily be seen that to remove the wheel it is only necessary to raise the thumb-piece, and with it turn the cam, and thus force the jaws or clutches apart, when the wheel may be removed, the nut passing with the axle through the box of the wheel. It will also be as readily seen that when the wheel is pushed on in its place and the cam released, the jaws will be forced by the springs to close around the nut, and by means of the hooks in the ends of the cam passing around the hubs upon the bottom of the jaws, and the cam being secured against turning by means of the thumb-piece being turned down into the recess provided for it in the plate $d$, and there secured by the spring $o$, that no shock or jar can release the wheel. At the same time the end of the wheel is closed against dust or dirt getting to the axle, and is neat and compact in appearance.

I am aware that several devices have been patented that relate to the securing of wheels to their axles by means of grooves and catches, viz: Billings and Ambrose, June 25, 1850, No. 7,450; Beal, November 28, 1871, No. 121,270; Howland, March 18, 1879, No. 213,425; Mason, June 17, 1879, No. 216,524; Clark, May 30, 1882, No. 258,557; but I claim that my invention is materially different and superior to any of these for the following reasons, to wit: Billings and Ambrose, and also Beal and Howland use a sliding plate to engage the groove in the axle and in which the inner corners of the plate must be cut away to insure motion sufficient to allow the axle to be withdrawn, and thus they cannot completely encircle the axle, which I have accomplished by using the jaws which swing upon a pivot. The sliding plates will also bind in the groove or way in which they work, which is not the case where the jaws swing upon a pivot. The cam used by Billings and Ambrose will not remain hooked around the stud on the jaw while in use; but by the application of my device of a thumb-piece turning down into a recess on the plate and there confined by means of a spring, no shock or jar will cause it to unlock. Mason claims and uses keys or latches interfitted; but they must both be pivoted upon one side of the plate, and therefore the inner corners must also be cut away, as he shows, to secure room for the withdrawal of the axle, which objection I have overcome by pivoting the jaws in my device on opposite sides of the plate, thereby insuring a complete encirclement of the axle, which Clark claims cannot be done with less than three latches on one plate.

In all the cases cited there must be an axle especially prepared for their use, while my device can be applied to any carriage by means of the cylindrical nut with the annular groove about it, without marring or defacing the wheel in the least.

What I claim, therefore, and desire to secure by Letters Patent, is—

1. In a device for attaching wheels to their axles, two semi-cylindrical jaws or clutches, $h\ h$, having semi-cylindrical cavities in the flat sides thereof, pivoted opposite to each other upon a circular plate in such a manner as shall bring the said flat sides together and thus form an annular ring between them, in combination with a cam to operate the same, and an axle fitted with a groove near its end to conform to and be engaged by the said annular ring, all for the purpose set forth and described.

2. In combination with a circular plate having jaws or clutches pivoted upon its surface so as to form an annular ring and operated by a cam, the cylindrical nut $c$, having a groove around and near its end and fitted with an internal screw-thread within its end, by means of which it may be screwed upon the end of any axle in place of the common nut, and thus provide a groove around the end of the axle to be engaged by the jaws or clutches $h\ h$, substantially as shown and specified.

3. In a cam to operate the jaws or clutches $h\ h$, the combination of a thumb-piece or latch hinged to the hub of said cam and a recess in the surface of the circular plate, into which the said thumb-piece or latch may be turned down and prevent the cam from turning, and thus lock the jaws or clutches $h\ h$ together around the groove on the axle by means of the hooks on the ends of the said cam passing around the hubs on the ends of said jaws or clutches, all as shown and described.

In testimony that I claim the foregoing as my invention I have hereunto affixed my signature in presence of two witnesses.

J. WILLIAMS BEAL.

Witnesses:
 T. M. SARGENT,
 R. POTE WAIT.